United States Patent [19]

Blagev

[11] Patent Number: 5,512,317
[45] Date of Patent: Apr. 30, 1996

[54] DOPED MAGNETIC IRON OXIDE PARTICLES AND METHOD OF PREPARING THE SAME

[75] Inventor: Albena V. Blagev, Woodbury, Minn.

[73] Assignee: Minnesota Mining and Manufacturing Company, St. Paul, Minn.

[21] Appl. No.: 366,142

[22] Filed: Jan. 9, 1995

Related U.S. Application Data

[63] Continuation of Ser. No. 86,090, Jul. 6, 1993, abandoned.

[51] Int. Cl.$^6$ ........................................................ B05D 7/00
[52] U.S. Cl. ........................ 427/215; 427/127; 427/128; 427/130; 427/216; 427/217; 75/348; 75/349; 148/105
[58] Field of Search ................................. 427/215, 216, 427/217, 128, 130, 127; 75/348, 349; 148/105

[56] References Cited

U.S. PATENT DOCUMENTS

| | | | |
|---|---|---|---|
| 4,226,909 | 10/1980 | Kanten | 428/329 |
| 4,321,303 | 3/1982 | Morita et al. | 428/404 |
| 4,770,903 | 9/1988 | Schwab et al. | 427/128 |
| 4,863,793 | 5/1989 | Ogawa et al. | 428/323 |
| 5,183,709 | 2/1993 | Schwab et al. | 428/404 |

FOREIGN PATENT DOCUMENTS

| | | |
|---|---|---|
| 0393563 | 10/1990 | European Pat. Off. . |
| 0483951A1 | 7/1991 | European Pat. Off. . |
| 483951 | 5/1992 | European Pat. Off. . |
| 1-188428 | 7/1989 | Japan . |
| 2-167829 | 6/1990 | Japan . |

OTHER PUBLICATIONS

*A.I.Ch.E. Journal,* "Flow Patterns in Agitated Vessels," vol. 6, No. 1, pp. 109–114, (1960), no month.
*A.I.Ch.E. Journal,* "Agitation of Liquid Systems Requiring a High Shear Characteristic," vol. 9, No. 3, pp. 338–342 (May, 1963).
*Journal of Paint Technology,* "Mixing Processes in the Protective Coating Industry," vol. 40, No. 517, pp. 66–79 (Feb. 1968).
*Journal of Magnetic and Magnetic Materials 31–34,* "Time Variation of Coercivity in Cobalt–Contained Iron Oxides Particles," pp. 943–944 (1983), no month.
*IEEE Transactions on Magnetics,* "Recommendation of a Simple and Universally Applicable Method for Measuring the Switching Field Distribution of Magneting Recording Media," Mag. 20, No. 1, pp. 81–83 (Jan. 1984).
*Environ. Sci. Technol.,* "Influence of Aggregation on the Uptake Kinetics of Phosphate by Goethite," vol. 19, No. 7, pp. 632–637 (1985), no month.
*The Complete Handbook of Magnetic Recording* (1988), no month.
"Metal Particulate Medium for Ultra High Density Recording," vol. 14, No. 2, pp. 41–44 (1990), no month.
*IEEE Transactions on Magnetics,* "Effect of Surface Properties on Cobalt Modification of Iron," vol. 28, No. 5 (Sep. 1992).

*Primary Examiner*—Shrive Beck
*Assistant Examiner*—David M. Maiorana
*Attorney, Agent, or Firm*—Gary L. Griswold; Roger R. Tamte

[57] ABSTRACT

A doped magnetic iron oxide particle suitable for use in magnetic recording media, and methods of preparing the doped magnetic iron oxide particle, are disclosed. The doped magnetic iron oxide particle has the general formula:

$$Co_xFe^{+2}{}_{1-x}Fe_2{}^{+3}O_4, \text{ wherein } 0<x\leq1,$$

wherein essentially all of the cobalt(II) and iron(II) dopants are present in a shell surrounding a core of a magnetic iron oxide particle. The doped magnetic iron oxide particle has a narrow switching distribution, high squareness, high coercivity and high remanence.

4 Claims, 1 Drawing Sheet

FIG. 1

DOPED MAGNETIC IRON OXIDE PARTICLES AND METHOD OF PREPARING THE SAME

This is a continuation of application Ser. No. 08/086,090 filed Jul. 6, 1993 now abandoned.

FIELD OF THE INVENTION

The present invention relates to a magnetic iron oxide particle useful for recording information. More particularly, the present invention relates to an acicular, doped iron oxide particle having the general formula:

$Co_xFe^{+2}{}_{1-x}Fe_2{}^{+3}O_4$, wherein $0<x\leq 1$, and wherein essentially all of the cobalt(II) and iron(II) are present in a shell surrounding a core of a magnetic iron oxide particle, and to methods of preparing the doped magnetic iron oxide particles.

BACKGROUND OF THE INVENTION

Magnetic recording media have a magnetic layer containing magnetic particles and a binder as main components. The magnetic layer is coated on a nonmagnetic support, such as a polyethylene terephthalate, polyethylene naphthalate, a polycarbonate or a polyamide film.

The magnetic particles are a key component of the magnetic recording media. Magnetic particles present in the magnetic layer typically are acicular particles having magnetic moments capable of responding to an externally applied magnetic filed. The ability of magnetic particles to respond to an externally applied magnetic field in a desired way is measured by several established parameters. Four important parameters are remanence ($B_r$), coercivity ($H_c$), switching field distribution (SFD) and squareness (Sq). These four parameters measure, respectively, the extent to which a magnetic particle remains magnetized after the external applied field is removed ($B_r$), the ability of the imposed magnetization to be maintained rather than lost through the influence of adjacent domains ($H_c$), the measure of the spread of coercivities around an average value (SFD) and the ability of the recording medium to retain the recording signal in memory (Sq). These parameters are determined using standard methods, and are used to measure the quality of recording that can be obtained.

A variety of magnetic particles have been used in the magnetic layer of magnetic recording media. The usefulness of a magnetic particle is related to the chemical composition, size, shape and magnetic properties of the particle. For example, desirable magnetic particles have a high coercivity and a high remanence to give high output; and have a small particle size to provide smoother surfaces (i.e., increased output) and lower noise. However, in practical applications, compromises are required. For example, record and erase head limitations place an upper limit on the coercivity, and magnetic or chemical stability places a lower limit on the reduction of particle size.

The switching field distribution (SFD) is an important magnetic property of magnetic particles used in magnetic recording media and is related to coercivity. Coercivity ($H_c$) is the field strength required to cause a magnetic reversal of the magnetic particles in the magnetic recording media. The coercivity is sufficiently small to allow successful writing, and overwriting or erasure, by available heads. The coercivity also is sufficiently large for the magnetic particles to resist unwanted changes or degradation of the signal during storage. The coercivity however is only a median field strength, and the breadth of the distribution of field strength, centered on the coercivity, wherein magnetic reversal occurs, also is important. The breadth of this distribution is the SFD.

A narrow SFD facilitates the writing of sharp, well-defined magnetic transitions and therefore improves the ability of magnetic particles to record information at high densities. A broad SFD not only diffuses the magnetic transitions but also can lead to a variety of other problems, such as problems in erasure or in overwriting old information with new information. Therefore, in addition to providing a magnetic particle having a sufficient coercivity, the magnetic particle also must have a sufficiently narrow SFD.

Magnetic particles or pigments used in magnetic recording media are prepared by a chemical precipitation process. Chemical precipitation provides small magnetic particles of uniform composition and having a narrow size distribution. The particle size and morphology of precipitated magnetic particles can be controlled by varying precipitation conditions, such as concentration of starting materials, temperature, reaction time, and choice of starting materials.

Historically, gamma ferric oxide ($\gamma$-$Fe_2O_3$) was the standard magnetic particle used in magnetic recording media. Gamma ferric oxide has excellent chemical and physical stability and therefore has been the most useful of the magnetic particles. The presently-used $\gamma$-$Fe_2O_3$ particles are acicular (i.e., needle-like or rod-like) in shape. This shape anisotropy is a major source of the magnetic anisotropy of acicular $\gamma$-$Fe_2O_3$. Another source of magnetic anisotropy in $\gamma$-$Fe_2O_3$ is magnetocrystalline in origin, arising from the interaction of electron spins with the crystal structure of the oxide. These two types of anisotropy determine the external magnetic field needed to switch the magnetization from one energetically preferred direction to another preferred direction, and therefore determine the coercivity of the magnetic particle.

Acicular $\gamma$-$Fe_2O_3$ particles typically have a length of about 0.15 to about 0.50 μm (micrometers). Magnetic particles of this size are a compromise between being sufficiently small to assure a low noise level and sufficiently large to avoid magnetic instability. Acicular $\gamma$-$Fe_2O_3$ particles having a coercivity in the range of 300 to 400 Oe (Oersteds) are still used in present-day low-density magnetic recording media and are precursors for modified magnetic iron oxides. These magnetic particles have coercivities up to about 1000 Oe and are more suitable for use at high recording densities, but also are more expensive and in some respects less stable.

Gamma ferric oxide is produced by first growing particles of iron oxide hydroxide, either α-FeOOH (goethite) or γ-FeOOH (lepidocrocite). Dehydration of α-FeOOH forms particles of nonmagnetic α-$Fe_2O_3$ (hematite). The hematite particles then are reduced to yield particles of $Fe_3O_4$ (magnetite). Magnetite itself is a useful magnetic particle, and has served as the core particle for a cobalt surface-doped magnetic particle disclosed in Kanten U.S. Pat. Nos. 4,137,342 and 4,226,909. Magnetite, however, has chemical and magnetic instabilities, and therefore is oxidized to particles of $\gamma$-$Fe_2O_3$ for most recording applications.

Gamma iron oxide, having a coercivity of about 300 to about 400 Oe, is suitable only for low recording density applications. However, many magnetic recording applications require high recording densities, and therefore require a magnetic particle having a coercivity of greater than about 400 Oe. Cobalt-doped iron oxide particles have been used in these high recording density applications.

Cobalt-doped iron oxides exhibit many of the benefits of $\gamma$-Fe$_2$O$_3$ (e.g., chemical stability), and also have a coercivity of about 400 to about 1000 Oe. Early cobalt-doped iron oxides had cobalt(II) ions uniformly dispersed throughout the iron oxide particle. These cobalt-doped iron oxides exhibited a temperature-dependent coercivity and were subject to mechanical stresses that reduced magnetic properties.

Improved cobalt-doped iron oxides positioned cobalt(II) on or near the surface of the magnetic particle. These doped magnetic particles were termed "epitaxial" or "surface-doped" products, and demonstrated an increased coercivity and a decreased temperature dependence over the early cobalt-doped iron oxides. Cobalt-modified iron oxide particles have been technically and commercially successful in magnetic recording media. However, investigators continue to seek improved doped magnetic particles that have higher coercivities and narrower switching field distributions.

Cobalt-doped iron oxides, and methods for preparing them, have been disclosed in several patents and publications. For example, Kanten U.S. Pat. Nos. 4,137,342 and 4,226,909 disclose cobalt-doped iron oxides, and the preparation thereof, wherein cobalt(II) is present in the surface layer over a core including ferrous and ferric iron.

Schwab et al. U.S. Pat. No. 4,770,903 discloses a magnetic iron oxide having a $\gamma$-Fe$_2$O$_3$ core and a ferrite shell including cobalt(II) and iron(II). The magnetic iron oxide is prepared by performing two precipitations.

Ogawa et al. U.S. Pat. No. 4,863,793 discloses ferromagnetic iron particles, including cobalt-modified particles. The ferromagnetic particles further can include elements, such as silicon, to improve the properties of the particles.

European Patent Application 0 393 563 discloses cobalt-modified iron oxide particles having a magnetic core and a ferrite shell including cobalt(II) and iron(II). The cobalt-modified iron oxide particles, after doping, are treated with an aqueous alkali silicate to improve the stability of the cobalt-modified iron oxide.

Japan Laid-Open Patent Application JP H2-167829 discloses a cobalt-containing ferromagnetic iron oxide powder wherein a silicate compound and a cobalt compound are coated on acicular alpha iron oxide hydroxide ($\alpha$-FeOOH).

Japan Laid-Open Patent Application JP H1-188428 discloses a cobalt-containing ferromagnetic iron oxide powder and its method of manufacture wherein the powder has a nuclear crystal covered with a cobalt compound. The outermost layer of the powder also can include silica.

The above-described references disclose a method of providing a layer of cobalt(II) and iron(II) on the surface of an iron oxide core. However, such cobalt-doped magnetic particles exhibit disadvantages and drawbacks, such as a high switching field distribution (SFD) and a relatively high coercivity instability in relation to changes in temperature. The present invention therefore is directed to: 1) a doped magnetic iron oxide particle that overcomes these disadvantages; and 2) to methods of manufacturing the doped magnetic iron oxide particle.

SUMMARY OF THE INVENTION

The present invention is directed to an acicular magnetic iron oxide particle that is doped with cobalt(II) and iron(II), and has a narrow switching field distribution, high squareness, high remanence and excellent temperature-coercivity stability. These characteristics are obtained without an unacceptable decrease in coercivity of the magnetic iron oxide. The present invention also is directed to methods of preparing the doped magnetic iron oxide particle. More particularly, the present invention is directed to a doped magnetic iron oxide particle having the general formula:

$Co_xFe^{+2}_{1-x}Fe_2^{+3}O_4$, wherein $0<x\leq1$,

Preferably, essentially all of the cobalt(II) and iron(II) are present in a dopant layer or shell surrounding a core of a magnetic iron oxide.

The invention provides a method of manufacturing a doped magnetic iron oxide particle comprising:

(a) forming an aqueous mixture of a magnetic iron oxide and a base;

(b) adding a water-soluble dopant compound selected from the group consisting of cobalt(II) compounds, iron(II) compounds or mixtures thereof to the mixture of step (a) and agitating the resulting mixture;

(c) heating and agitating the mixture of step (b) to a sufficient temperature and for a sufficient time for the dopant compound to interact with the magnetic iron oxide to form the doped magnetic iron oxide particle; and (d) separating the doped magnetic iron oxide particles from the aqueous mixture;

provided that a water-soluble silicate is added to the aqueous mixture of step (a), (b) or (c) before the reaction of step (c) has been completed, and, in step (c), a portion of the silicate reacts with the magnetic iron oxide.

The process preferably includes drying the magnetic iron oxide particle from step (d). The doped magnetic iron oxide particle comprises a magnetic iron oxide core surrounded by a shell comprising the dopant compound and the silicate compound.

Another aspect of the present invention is to provide a doped magnetic iron oxide particle comprising greater than 0% to about 10% by weight cobalt(II), 0% to about 20% by weight iron(II), 0.1% to about 0.4% by weight silicon (present as a silicate), based on the total weight of the doped magnetic iron oxide particle, wherein the cobalt(II), iron(II) and silicate are dispersed in a layer surrounding a core of a magnetic iron oxide.

Also within the scope of this invention is a doped magnetic iron oxide particle, comprising a magnetic iron oxide core surrounded by an outer dopant layer or shell comprising cobalt (II), iron (II) and a silicate, and generally having the following properties (although not all the below-listed properties must be obtained simultaneously):

1/SFD (inverse of switching field distribution) of at least 0.1 (and usually in the range of 0.2 to 0.6) greater than an essentially identical doped magnetic iron oxide particles which have not been made in accordance with this invention (i.e., without silicate present during the doping reaction and without the high shear agitation condition specified below);

$H_c$ of about 500 to 1500 Oersteds (Oe);

Sq of about 0.75 to 0.92;

$B_r$ of about 1000 to 1500 gauss (G);

dopant layer thickness of about 2 to 40 nanometers (nm);

core magnetic iron oxide particle aspect ratio (length/diameter) of about 4 to 12, preferably about 7 to 12, and length typically being about 0.1 to 0.4 micrometers, preferably no more than about 0.2 micrometers.

The doped magnetic iron oxide particles also are preferably characterized by a dopant layer which is homogeneous and epitaxial, and the thickness of which is approximately uniform (as shown in high resolution transmission electron microscope (TEM) photographs of cross sections of the particles).

The temperature stability of the inventive doped magnetic iron oxide particles is also generally improved over that of magnetic particles which have not been made in accordance with this invention. However, temperature stability of the inventive magnetic particles (as is the case for magnetic particles in general) is dependent on coercivity. As coercivity increases, temperature stability of a particle generally decreases, or the change in coercivity with change in temperature increases. In the case of the inventive magnetic particles, a change of about $-3$ Oe/C.° or less is characteristic of magnetic particles having a coercivity of less than 900 Oe. In the case of higher coercivity magnetic particles (e.g., approximately 950 Oe) a temperature sensitivity of about $-3.5$ Oe/C.° or less would be characteristic. For lower coercivity particles (e.g., 840 Oe), $-2.5$ Oe/C.° or less would be characteristic of the inventive magnetic particles. Absent the invention, these figures (i.e., the sensitivity of coercivity to temperature) would be greater in magnitude.

Another aspect of the present invention is to provide a high shear agitation method of manufacturing a doped magnetic iron oxide particle having the formula given above, comprising the steps of:

(a) forming an aqueous mixture of a magnetic iron oxide particle and a base;

(b) agitating the mixture of step (a) under high shear conditions such that there is turbulent flow with Reynolds number ($N_{Re}$) of at least $10^5$, impeller discharge rate (Q) of at least 6.8 liters/second and velocity head (H) of at least 450 ergs/gram;

(c) adding a dopant compound selected from the group consisting of cobalt(II) compounds, iron(II) compounds and mixtures thereof to the agitated mixture of step (b);

(d) maintaining agitation under the high shear conditions of step (b) and heating the mixture of step (c) to a sufficient temperature and for a sufficient time for the dopant compound to interact with the magnetic iron oxide particle to form the doped magnetic iron oxide particle;

(e) separating the doped magnetic iron oxide particle from the aqueous mixture; and (f) drying the doped magnetic iron oxide particle.

DETAILED DESCRIPTION

An acicular doped magnetic iron oxide particle having improved physical and magnetic properties is prepared: (1) by having a silicate present during the doping process, (2) by utilizing high shear conditions during the doping process, or (3) a combination thereof. The doped iron oxide particle is useful in high density magnetic recording applications.

Two alternative methods of preparing an improved doped magnetic iron oxide particle are described hereinafter. In one alternative method, a doped magnetic iron oxide particle of the present invention is prepared by having a water-soluble silicate present during the doping process. Silicates have been used in methods of doping magnetic iron oxide particles previously. However, a silicate previously was used either after the doped magnetic iron oxide particle was formed or prior to forming the doped magnetic iron oxide particle. Adding a silicate to the doped magnetic iron oxide particle either prior to or subsequent to doping the particle did not sufficiently improve the magnetic properties of the magnetic doped iron oxide particle, but acted as a growth modifier, an anti-sintering agent, or a surface modification agent.

In accordance with the present invention, a silicate is present with the cobalt(II) and iron(II) during the doping reaction. As will be demonstrated in detail hereinafter, the presence of a silicate during the doping reaction improves the magnetic properties of a doped magnetic iron oxide particle, especially with respect to a narrower switching field distribution.

In one embodiment, a doped magnetic iron oxide particle of the present invention is prepared by first thoroughly dispersing a magnetic iron oxide, such as $\gamma$-Fe$_2$O$_3$, Fe$_3$O$_4$ (magnetite), a berthollide oxide (($\gamma$-Fe$_2$O$_3$)$_x$(Fe$_3$O$_4$)$_{1-x}$) or a cobalt-modified iron oxide, in deionized water to form a slurry. Sufficient agitation is continued throughout the doping process to maintain good mixing or turbulent flow conditions. The magnetic iron oxide is present in the dispersion in an amount of about 0.5% to about 15% by weight of the dispersion, and preferably in an amount of about 2% to about 8% by weight of the dispersion.

The slurry next is purged or contacted with inert gas, such as nitrogen, to remove dissolved oxygen from the slurry. The inert gas is bubbled through the slurry, maintained as a gas over the slurry, or both. Then, while under constant agitation and a continuing inert gas purge, a sufficient amount of a base is added to the slurry such that an excess amount of base over the stoichiometric amount of dopant compound is present in the slurry. Preferably, a sufficient quantity of a base is added to provide about a 0.75 to 4 molar excess of base over the molar amount of dopant compound added to the slurry.

The type of base added to the agitated slurry is not particularly limited, as long as the base is sufficiently alkaline to interact with a dopant compound and precipitate the dopant compound, i.e., cobalt(II) and iron(II), as a hydroxide. Accordingly, exemplary bases include, but are not limited to, the alkali metal hydroxides, like sodium hydroxide, potassium hydroxide and lithium hydroxide; ammonium hydroxide; and the alkylammonium hydroxides, like methylammonium hydroxide, tetramethylammonium hydroxide, and isopropylammonium hydroxide. To achieve the full advantage of the present invention, the base is sodium hydroxide or potassium hydroxide because these bases are economical, have sufficient alkalinity to precipitate the dopant compound as a hydroxide, and have water-soluble cations that are easily separated or rinsed from the doped magnetic iron oxide particle.

The resulting slurry including the magnetic iron oxide and the base is maintained at a temperature of about 20° C. to about 35° C. Then, an aqueous solution of the dopant compound is added slowly to the slurry (e.g., dropwise). The aqueous solution of the dopant compound includes about 0.1% to about 20%, and preferably about 0.2% to about 10%, by weight of the dopant compound. For batch sizes of about 1500 to 2000 ml, the aqueous solution of the dopant compound is added to the slurry at the rate of about 0.5 to about 5 milliliters per minute (ml/min). The addition of the dopant compound to the slurry containing the magnetic iron oxide and the base causes the water-soluble dopant compound to precipitate on the surface of the magnetic iron oxide particle. Initially, the precipitate is a hydroxide, but as the doping reaction proceeds, the hydroxide reacts with the magnetic iron oxide core material and other species are formed.

Preferably, the dopant compound is a mixture of water-soluble cobalt(II) and iron(II) salts, and one salt is added very shortly after the other. To achieve the full advantage of the present invention, the weight ratio of iron(II) to cobalt(II) is about 2 to 1. Exemplary dopant compounds include, but are not limited to, cobalt chloride, cobalt nitrate, cobalt sulfate, cobalt acetate, cobalt bromide, ferrous bromide, ferrous chloride, ferrous nitrate, ferrous sulfate, and mixtures thereof.

In addition to the dopant compound, a water-soluble silicate compound is added to the slurry including the magnetic iron oxide. The water-soluble silicate compound can be added either to a slurry including only the magnetic iron oxide, to a slurry including the magnetic iron oxide and the base, to a slurry including the magnetic iron oxide and the base after the addition of the dopant compound, or to a slurry during the reaction between the magnetic iron oxide and dopant compound to form the ferrite layer. However, the water-soluble silicate compound must be present in the slurry during the doping reaction between the magnetic iron oxide and the dopant compound, and a portion of the silicate must react with the magnetic iron oxide.

The silicate compound is a water-soluble compound, and typically is a sodium silicate or a potassium silicate. Exemplary silicate compounds include but are not limited to sodium metasilicate, sodium sesquisilicate, sodium orthosilicate and the various liquid grades of alkaline sodium and potassium silicates. The silicate compound is added to the slurry in a sufficient amount to effectively disperse the magnetic iron oxide particles. A magnetic iron oxide, even in an aqueous dispersion, is present as agglomerated particles. The silicate compound is an effective dispersant and is believed to decrease the agglomerate size.

However, if too great of an amount of silicate compound is added in the slurry, the increase in the capacity of the silicate compound to disperse the magnetic iron oxide particles levels off. In addition, doping of the magnetic iron oxide can be hindered because the silicate compound occupies available sites on the surface of the magnetic iron oxide, and thereby prevents doping by the dopant compound.

The specific surface area of the iron oxide particles also affects the amount of silicate added to the slurry. Generally, as specific surface area increases, the quantity of silicate added to the slurry also increases.

Appropriate quantities of silicate are chosen to effectively disperse the iron oxide particles in suspension. This quantity is below the amount which would significantly hinder adhesion of effective amounts of the dopant compound to the magnetic iron oxide particles. Such appropriate quantities can be determined experimentally. The preferred quantities are those which yield improvements in the magnetic properties mentioned above (Sq and 1/SFD) without significant decrease in $H_c$.

For example, for magnetic iron oxide particles having a specific surface area of about 60 m$^2$/g (square meters per gram), a sufficient quantity of water-soluble silicate compound is in the range of 0.1 to 0.4 weight percent silicon (as silicate), based on the total weight of the doped magnetic iron oxide particles as 100 weight percent. Such doped iron oxide particles, in that case, include about 0.25 to 1.1 weight percent silicate (as $SiO_3^{-2}$).

The slurry containing the magnetic iron oxide particles, the base, the dopant compound and the silicate compound is continuously agitated, and the temperature of the slurry is raised to about 40° C.–105° C., and preferably to about 75° C.–95° C., to react the magnetic iron oxide particles and the dopant compound and form a doped magnetic iron oxide particle. The slurry is maintained at about 40° C. to about 105° C. for about 2 to about 12 hours, and preferably about 3 to about 6 hours, to allow the doping reaction to proceed to completion. The slurry is purged with an inert gas throughout the doping reaction to help prevent oxidation of the iron(II). The course of the doping reaction is monitored by intermittently measuring the coercivity ($H_c$) of a sample of the slurry. When the coercivity of successive samples ceases to increase, the doping reaction is complete.

After completion of the doping reaction, the resulting slurry is cooled, washed with deionized water and filtered. The filter cake of wet doped magnetic iron oxide particles then is dried using a drying gas selected from: air, nitrogen ($N_2$), a mixture of air and $N_2$, a mixture of air and water vapor, a mixture of $N_2$ and water vapor or a mixture of air, $N_2$, and water vapor. The drying gas is at a temperature of about 50° C. to about 120° C. The temperature, as well as the ratio of air, nitrogen and water vapor, can remain constant or be varied during the course of the drying step to sufficiently oxidize the iron(II) under relatively mild conditions. It is not essential to dry the filter cake under conditions that oxidize the iron(II), however, the magnetic properties (e.g., the SFD of the doped magnetic iron oxide particles) are further improved when the iron(II) is partially or completely oxidized. Oxidation of the iron(II) provides a more uniform and homogeneous doped magnetic iron oxide particle because less iron(II) is available to migrate into the particle core and thereby adversely affect the SFD.

The magnetic properties exhibited by a doped magnetic iron oxide of the present invention are related to the size, shape and surface properties of the starting magnetic iron oxide particles. Therefore, an improvement in magnetic properties is measured in reference to the magnetic properties of the starting magnetic iron oxide particles.

For example, for a $\gamma$-$Fe_2O_3$ having a coercivity ($H_c$) of 381 Oe, a squareness (Sq) of 0.874, 1/SFD of 3.57 and $B_r$ of 1360 G (gauss), a cobalt-doped $\gamma$-$Fe_2O_3$ prepared by the above-described method exhibited an $H_c$ of about 530–960 Oe, Sq of 0.86 to 0.92, 1/SFD of about 2.5 to 3.45, and a $B_r$ of about 1300 to about 1480 G. The extent of improvement in these various properties depends on the amounts of dopant used. The ranges just recited are for amounts of cobalt ranging from 1 to 5 weight percent and amounts of iron(II) ranging from 2 to 10 weight percent, respectively (the percentages being based on the $\gamma$-$Fe_2O_3$ as 100%). A doped $\gamma$-$Fe_2O_3$ prepared by the above-described method and having an $H_c$ of 900 Oe demonstrated a temperature sensitivity of −3.1 Oe/C.°.

A doped $\gamma$-$Fe_2O_3$ prepared by the method of the present invention has improved magnetic properties over undoped $\gamma$-$Fe_2O_3$ and over doped $\gamma$-$Fe_2O_3$ prepared by prior methods. For example, the $H_c$, or mean field strength needed to cause magnetic reversal, is increased by about 150 to about 600 Oe, thereby providing a doped magnetic iron oxide particle that resists signal degradation. A doped $\gamma$-$Fe_2O_3$ prepared by the above-described method also retained a high remanence, thereby maintaining its magnetic orientation after an applied field is removed. Squareness (i.e., the ratio of remanent moment ($M_r$) to maximum moment ($M_m$) exhibited by a magnetic particle) is a measure of the ability of the recording medium to retain the recording signal in memory. A high Sq value signifies a high remanent magnetization and superior signal output, characterized by sharper magnetic flux transitions. A high Sq permits high signal packing in digital recording. A doped $\gamma\text{-}Fe_2O_3$ of the present invention exhibited a high squareness.

A doped $\gamma\text{-}Fe_2O_3$ particle of the present invention also has a narrow switching field distribution (SFD). The SFD is a dimensionless parameter and is defined by the equation $\Delta H_c/H_c$, wherein $\Delta H_c$ is the width of the coercivity range at the one half peak height of the differentiated hysteresis curve for a handspread as described hereinafter. The SFD therefore is a measure of the spread in coercivities around an average coercivity value, and is determined by finding the difference in coercivities ($\Delta H_c$) between coercivities that correspond to 25 percent and 75 percent points on the hysteresis loop. SFD and its measurement are fully described in F. Jorgensen, *The Complete Handbook of Magnetic Recording*, 3rd Edition, (1988), pages 94–97, incorporated herein by reference. A narrow SFD is desired because the magnetic particles more uniformly respond to an applied electromagnetic field.

SFD increases as coercivity of the magnetic particle increases. Therefore, the SFD of a doped magnetic iron oxide particle of the present invention is greater than the SFD of the starting $\gamma\text{-}Fe_2O_3$ because the doped magnetic iron oxide particle has a greater coercivity than the undoped $\gamma\text{-}Fe_2O_3$. However, a doped magnetic iron oxide particle prepared by the method of the present invention has a narrower SFD in comparison to other magnetic iron oxide particles of essentially identical coercivity.

Figure 1:
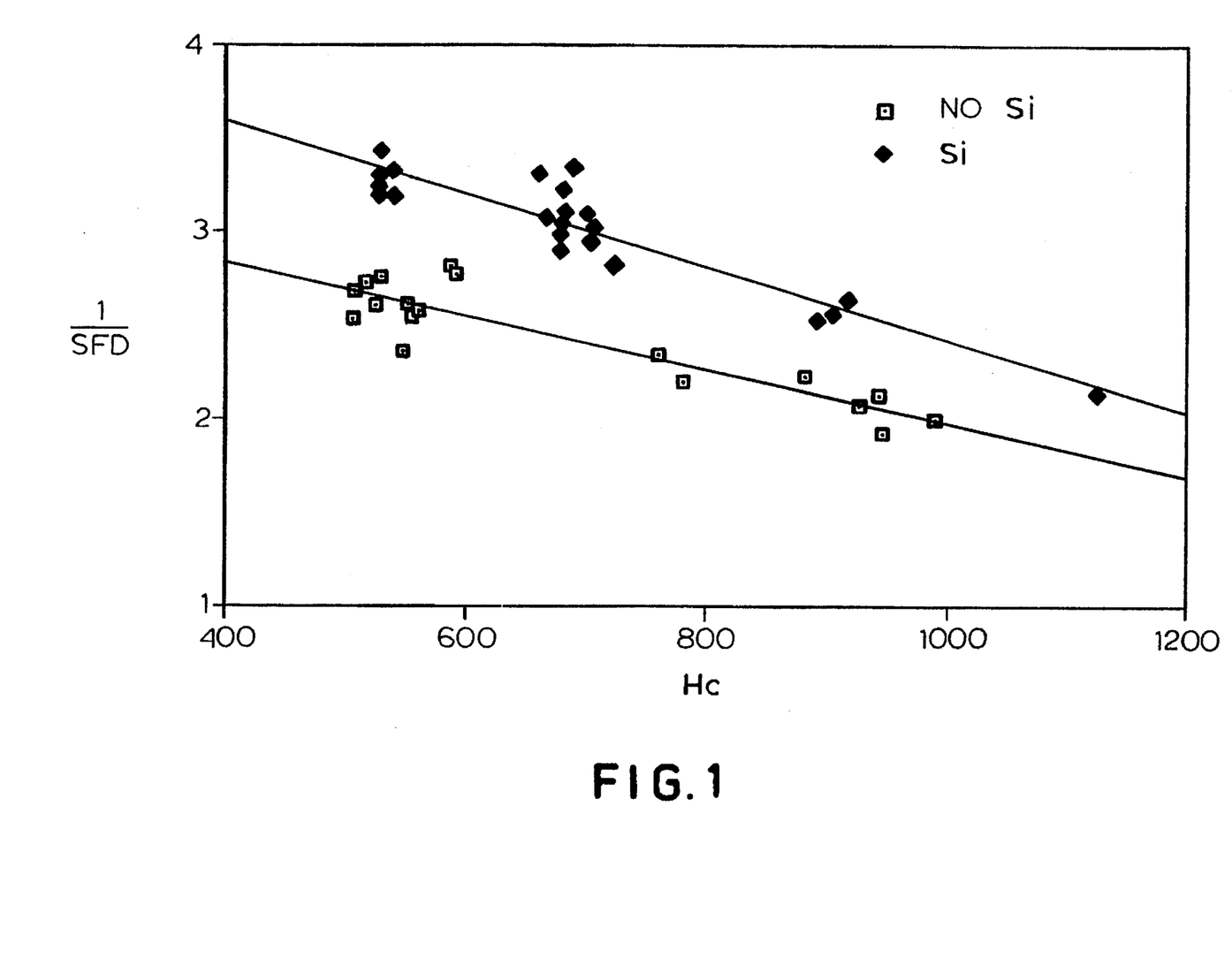
FIG. 1 is a plot of 1/SFD (inverse of switching field distribution) vs. coercivity ($H_c$).

This phenomenon is demonstrated in FIG. 1. FIG. 1 is a plot of the inverse of the SFD (i.e., 1/SFD) versus coercivity. The inverse of the SFD is a number greater than one and is plotted for convenience. Therefore, in FIG. 1, a large value for 1/SFD corresponds to a narrow SFD and is SFD increases (i.e., 1/SFD decreases). In particular, FIG. 1 compares magnetic $\gamma\text{-}Fe_2O_3$ particles doped with varying amounts of cobalt(II) and iron(II) to provide doped magnetic $\gamma\text{-}Fe_2O_3$ particles having different coercivities. The doped $\gamma\text{-}Fe_2O_3$ particles all were prepared by the same method, except some samples were doped in the presence of a silicate and other samples were doped in the absence of a silicate. FIG. 1 clearly shows that the presence of a silicate during the doping step increases 1/SFD, or conversely, narrows the SFD. For doped $\gamma\text{-}Fe_2O_3$ particles having the same coercivity, the particles that were doped in the presence of silicate exhibited improved SFD.

Table 1 illustrates the improved Sq and $B_r$ exhibited by a doped magnetic iron oxide particle prepared by a method of the present invention. The data in Table 1 compares the $B_r$ and Sq values for the doped $\gamma\text{-}Fe_2O_3$ particles of Example 1 and Comparative Example 1.

EXAMPLE 1

Iron Oxide Particles Doped in the Presence of a Silicate Compound

Acicular magnetic iron oxide particles ($\gamma\text{-}Fe_2O_3$), YS 1911 from ISK (Ishikara Sangyo Kaisha, Ltd.) and having a length/diameter ratio of about 7, were doped by dispersing the $\gamma\text{-}Fe_2O_3$ particles (20 g) in water (1000 ml), then adding a sufficient amount of sodium hydroxide (NaOH) (80 g in 200 ml water) to obtain 1.1 N NaOH solution after precipitation of the metal cations from the slurry as hydroxides. A nitrogen gas flow purged oxygen from the slurry, then aqueous solutions of ferrous sulfate including 2% by weight iron(II) (140 ml) and cobalt sulfate including 1% by weight cobalt(II) (140 ml) were added to the slurry dropwise over a 50 minute period. The slurry remained at room temperature throughout the addition of the cobalt(II) and iron(II) solutions. An aqueous solution (80 ml) including 2% by weight of sodium silicate nonahydrate ($Na_2SiO_3 \cdot 9H_2O$) was added to the slurry to provide 0.2% by weight silicon (as a silicate, $SiO_3^{-2}$) based on the weight of iron oxide, in the slurry. The temperature of the resulting slurry then was increased to 95° C. over 30 minutes, and the slurry was held at 95° C. for 2 hours. The resulting doped $\gamma\text{-}Fe_2O_3$ particles were washed, filtered and dried in air at 110° C. for 14 hours.

The doped $\gamma\text{-}Fe_2O_3$ particles of Comparative Example 1 were prepared in an essentially identical manner, except the $\gamma\text{-}Fe_2O_3$ particles were doped with cobalt(II) and iron(II) in the absence of a silicate, and the $\gamma\text{-}Fe_2O_3$ particles were dried under nonoxidizing conditions. The properties of the doped $\gamma\text{-}Fe_2O_3$ particles of Example 1 and Comparative Example 1 are summarized in Table 1.

In Table 1 and in the data which follow hereinafter, properties of the particles were measured using handspreads. Handspreads are dry coatings of magnetic iron oxide dispersions in standard pigment binder recording media formulations. The magnetic iron oxide particles are dispersed by standard techniques in the binder formulation, coated onto a polymer (e.g., polyester) substrate using a manual knife coating apparatus, dried and then tested. Thus, the properties are those of the handspreads and not the doped magnetic iron oxide particles per se.

The procedure for making the handspreads is as follows: A magnetic iron oxide binder dispersion was made in a small ball mill (made by Gardner Laboratories) containing 200 g of stainless steel ball milling media having a diameter of about 3.2 mm. The formulation for the dispersion was:

| | |
|---|---|
| Magnetic Iron Oxide | 16.0 g |
| Dispersant Solution[1] | 0.85 g |
| Quaternary Ammonium Acetate (furnished as Emcol Acetate from Witco Chemical Company, 80% solids in ethylene glycol) | 0.64 g |
| Toluene | 7.2 g |

[1] polyoxyalkyl polyol (described in U.S. Pat. No. 4,889,895 at columns 13–14) 75% solids in tolulene.

The above magnetic iron oxide dispersion was milled for 25 minutes. Then, the following polymer binder solution was furnished:

| | |
|---|---|
| Polymer solution comprising 38% total solids of a 3/1 weight ratio mixture of: (a) VYHH (a vinyl chloride vinyl acetate copolymer available from Union Carbide Corp.) and (b) dioctyl phthalate; and | 7.3 g. |
| Methyl ethyl ketone | 8.1 g. |

The polymer binder solution was mixed with the magnetic iron oxide dispersion, and the mixture was milled 15 minutes. Then, a handspread of the resulting dispersion was made on a polyester sheet typical of those used for magnetic recording media substrates. The handspread pigment binder coating was about 25 micrometers thick. It was oriented in a longitudinal direction with a magnetic field strength of 1600 gauss, and then dried.

TABLE 1

|  | Doped γ-Fe₂O₃ of Example 1 | Doped γ-Fe₂O₃ of Comparative Example 1 |
|---|---|---|
| Remanence |  |  |
| $B_r$ average (G) | 1405 | 1204 |
| $B_r$ maximum (G) | 1549 | 1463 |
| $B_r$ minimum (G) | 1306 | 1106 |
| Squareness |  |  |
| Sq average | 0.889 | 0.883 |
| Sq maximum | 0.935 | 0.878 |
| Sq minimum | 0.865 | 0.811 |

Table 1 illustrates that a doped γ-Fe₂O₃ prepared in the presence of a silicate compound has an increased average remanence ($B_r$) (increased by about 200 G) and an improved minimum and maximum squareness.

Magnetic iron oxide particles of the present invention can be doped with cobalt(II) and iron(II) by performing two precipitations of the dopant compound on the magnetic iron oxide core. Example 2 illustrates this embodiment of the invention.

EXAMPLES 2–4

Doped Magnetic Iron Oxide Particles

The following solutions first were prepared:

Solution A1: 80 g sodium hydroxide (NaOH) in 200 ml deionized (DI) water

Solution A2: 80 g NaOH in 200 ml DI water

Solution B1: 8 g ferrous sulfate heptahydrate (FeSO₄·7H₂O) in 140 ml DI water

Solution B2: 10 g FeSO₄·7H₂O in 140 ml DI water

Solution C1: 10 ml cobalt sulfate heptahydrate (CoSO₄·7H₂O) solution (8% Co) diluted in 140 ml DI water Solution C2: 12.5 ml CoSO₄·7H₂O solution (8% Co) diluted in 140 ml DI water Solution D1: 0.8 g sodium silicate (Na₂SiO₃·9H₂O) (0.2% as Si/Fe₂O₃) in 20 ml DI water Solution D2: 0.8 g Na₂SiO₃·9H₂O (0.2% as Si/Fe₂O₃) in 20 ml DI water.

Forty g of γ-Fe₂O₃ (YS 1911 from ISK) were thoroughly dispersed in 80 ml deionized water using a blender for 2 minutes. The dispersion then was transferred to a vessel equipped with a stirrer and including 1 liter of deionized water. The resulting dispersion was agitated and solutions A1 and D1 were added to the agitated dispersion. The agitated dispersion also was purged with nitrogen at a flow rate of about 10 l/min. (liters per minute). After cooling the dispersion to about 30° C., the dropwise addition of solution B1 to the agitated dispersion was initiated at a rate of about 2 ml/min. After completing the addition of solution B1, solution C1 was added to the resulting dispersion dropwise and at a rate of about 2 ml/min. The temperature then was gradually increased to 95° C. at a rate of 1.2° C./min, and the doping reaction was continued for 3 hours. The dispersion then was diluted with deionized water, washed by magnetic sedimentation and decanting until the pH was 7.5, filtered and dried in air at 110° C. for 14 hours. The dried material then was redispersed in water, and the procedure was repeated using solutions A2, B2, C2 and D2 respectively, to further dope the magnetic iron oxide particles. After washing and filtering, the doped magnetic iron oxide particles were dried under nitrogen at 110° C. for 14 hours. The washing, filtering and drying of the iron oxide particles after the first doping step is not required.

A comparative experiment was conducted wherein the identical γ-Fe₂O₃ was doped with the same amounts of cobalt(II) and iron(II) in a double precipitation with all other conditions being the same, except that no silicate compound was present during the doping reaction, and the doped magnetic iron oxide particles were dried under nitrogen at 110° C. to provide the doped magnetic iron oxide particles of Comparative Example 2. The doped magnetic iron oxide particles of Examples 3 and 4 and Comparative Examples 3 and 4 were prepared by a single precipitation. The methods of preparation otherwise were identical except the particles of the Comparative Examples were prepared in the absence of a silicate and were dried in an inert atmosphere. The properties of these doped magnetic particles are summarized in Table 2.

TABLE 2

| Example | Drying Medium | $Co^{+2}$ | $Fe^{+2}$ | Si | $H_c$ | Sq | 1/SFD | $B_r$ | 45°[c] Gloss | $Fe^{2+}$ final |
|---|---|---|---|---|---|---|---|---|---|---|
|  |  | % | % | % | Oe | — | — | G | % | % |
| Ex. 2[a] | air, N₂ | 4.5 | 9 | 0.4 | 894 | 0.919 | 2.56 | 1359 | 61 | 5.1 |
| Ex. 3 | air | 1 | 2 | 0.2 | 537 | 0.924 | 3.35 | 1423 | 63 | 0 |
| Ex. 4 | air | 1 | 2 | 0.3 | 527 | 0.887 | 3.45 | 1549 | 66 | 0 |
| Comp. Ex. 2[b] | N₂ | 4.5 | 9 | 0 | 914 | 0.863 | 2.27 | 1351 | 58 | 9.4 |
| Comp. Ex. 3 | N₂ | 1 | 2 | 0 | 523 | 0.842 | 2.72 | 1500 | 48.8 | 1.7 |
| Comp. Ex. 4 | air | 1 | 2 | 0 | 516 | 0.881 | 2.94 | 1015 | 50.8 | 0 |

[a]Example 2 was prepared using a 2 step process:
1st layer, 0.2% Si, 2% Co, 4% Fe, drying in air
2nd layer, 0.2% Si, 2.5% Co, 5% Fe, drying in nitrogen
[b]Comparative Example 2 was prepared using a 2 step process:
1st layer, 2.25% Co, 4.5% Fe, reaction at 95° C. for 3.5 h
2nd layer, 2.25% Co, 4.5% Fe, drying in nitrogen Higher gloss data are believed to indicate improved dispersibility of the magnetic iron oxide particles in polymer binders.

Table 2 illustrates that the doped γ-Fe₂O₃ particles of Example 3, which were doped in the presence of 0.2% silicon (as silicate) based on the weight of the doped γ-Fe₂O₃ and dried in air (oxidizing medium), have a higher Sq and a narrower SFD (i.e., greater 1/SFD) than the doped γ-Fe₂O₃ of Comparative Example 3, which was doped in the absence of a silicate and dried in nitrogen (nonoxidizing medium). The doped γ-Fe₂O₃ particles of Example 4, incorporating 0.3% by weight silicon (as silicate), have a higher Sq, narrower SFD (smaller 1/SFD) and greater $B_r$ than the doped $\gamma$-Fe$_{23}$ particles of Comparative Example 4. The doped $\gamma$-Fe$_2$O$_3$ particles of Example 2 and Comparative Example 2 illustrate that 0.4% by weight silicon (as silicate) is not so large an amount of silicate to adversely affect the magnetic properties of the doped $\gamma$-Fe$_2$O$_3$ particles. However, amounts above about 0.4% by weight silicon (as silicate), may not be beneficial, as the silicate apparently prevents cobalt(II) and iron(II) from reacting with the surface sites on the $\gamma$-Fe$_2$O$_3$ particles.

In addition, the coercivity ($H_c$) of the doped magnetic iron oxide particles of Example 2 and Comparative Example 2 are approximately identical. There is a possible error in coercivity measurements of +/−15 Oe. However, the SFD of the doped magnetic iron oxide particles of Example 2 is substantially more narrow than the SFD of the doped magnetic iron oxide particles of Comparative Example 2 (i.e., larger 1/SFD). An increase of at least 0.2–0.6 in 1/SFD is a significant narrowing of the SFD.

A doped magnetic iron oxide particle prepared by the method of the present invention therefore has an $H_c$ of about 500 to about 1500 Oe, an improved 1/SFD defined as greater than 0.1 improvement (i.e., increase) in 1/SFD compared to a magnetic iron oxide particle doped under identical conditions but in the absence of a silicate, a high Sq of at least about 0.89 and a high $B_r$ of about 1000 to about 1500 G. Such doped magnetic iron oxide particles are suitable in applications requiring high recording densities, such as video recording, data tape, diskette and audio tapes.

In accordance with another feature of the present invention, a doped magnetic iron oxide particle having a narrow SFD, high Sq, high $B_r$ and a high $H_c$ of about 1000 to about 1500 Oe also can be prepared in the absence of a silicate compound provided the aqueous dispersion of the magnetic iron oxide, base and dopant compound is subjected to a minimum shear during the doping process.

The magnetic iron oxide particles remain dispersed as small agglomerates as long as the particles are subjected to sufficiently high shear conditions. In the absence of a sufficiently high shear, the dispersed magnetic iron oxide particles reagglomerate. Therefore, the reaction mixture is subjected to sufficiently high shear conditions until the doping reaction is complete. Doping of a magnetic iron oxide particle under high shear conditions provides a doped magnetic metal oxide particle having an improved SFD.

The preparation of a doped magnetic iron oxide particle by this alternative method is similar to the above-described method which utilizes a silicate compound. If desired, a silicate compound can be included in the high shear process during the doping reaction.

A doped magnetic iron oxide particle having a high coercivity, high squareness and a narrow SFD was manufactured by the above-described method, except a silicate compound was not included in the mixture and the mixture was subjected to high shear mixing. A doped magnetic iron oxide particle was prepared in a vessel having a capacity of about two to about three liters, a 16 cm diameter, and a height to diameter ratio of 18/16. The vessel had eight equally-spaced baffles about three centimeters wide. Each baffle had a plurality of holes or was foraminous. The vessel was equipped with a Cowles type mixer 8 cm in diameter and having eight flat blades alternating on the top and bottom of the Cowles mixer disk. Each blade of the mixer had a plurality of holes.

The above-described vessel and mixer were used to agitate an aqueous slurry including $\gamma$-Fe$_2$O$_3$ particles, base and dopant compound at a rate of at least about 1600 rpm and under high shear conditions. If the slurry was mixed at a rate of less than about 1600 rpm, the coercivity of the doped magnetic iron oxide particles was low and the SFD increased. The temperature stability of the doped magnetic iron oxide particles also decreased.

Mixing conditions for high shear can be determined for each vessel/agitator configuration and for each suspension concentration. Although the exact mechanism of doping the surface layer of a magnetic iron oxide particle is not known, it is theorized, but not relied upon herein, that the surface properties of the magnetic iron oxide particle are important to the doping reaction. Investigators have demonstrated a relationship between the number of reactive surface sites on a magnetic iron oxide particle and the increase in coercivity as a result of doping. Moreover, the number of the reactive surface sites was shown to depend on the degree of agglomeration of the magnetic iron oxide particles, with less agglomeration being preferred.

Therefore, in order to disperse the soft agglomerates of magnetic iron oxide particles present in the reaction suspension, a sufficient amount of energy, in the form of mixing, is required. When a sufficient amount of energy is supplied, the weak bonding between agglomerated particles is disrupted and the dopant compounds then have access to newly-created surface sites on the magnetic iron oxide particles. If the magnetic iron oxide particles are vigorously mixed or milled prior to the addition of a dopant compound, the magnetic iron oxide particles can reagglomerate, reducing the surface sites available during the doping reaction.

A doped magnetic iron oxide particle having improved magnetic properties results from subjecting a slurry comprising the magnetic iron oxide particles, base and dopant compound to high shear mixing. The rate of agitation can vary as long as the slurry is subjected to a minimum shear. The minimum shear required to provide a doped magnetic iron oxide particle of the present invention can be calculated from the above-described vessel and agitator operating at about 1600 rpm or greater. The necessary calculations are fully described in *Perry's Chemical Engineers' Handbook*, 5th Edition, (1973) at pages 19-3 through 19-14, incorporated herein by reference.

The presence or absence of turbulence in an impeller-stirred vessel is correlated to an impeller Reynolds number defined as:

$$N_{Re} = \frac{D_a^2 N \rho}{\mu}$$

wherein N is rotational speed (rev/sec); $D_a$ is impeller diameter; $\rho$ is fluid density; and $\mu$ is viscosity. Flow in a vessel is turbulent when $N_{Re}$ is greater than $10^4$.

From the above-described vessel, agitator and slurry present therein, having an impeller diameter ($D_a$) of 8 cm; a rotational speed (N) of 1600 rpm; a density ($\rho$) of 1 gm/cm$^3$; and a viscosity ($\mu$) of 0.01 gm/cm sec, the Reynolds number ($N_{Re}$) is calculated as $1.71 \times 10^5$. Therefore, to provide a doped magnetic iron oxide particle of the present invention a turbulent flow is required such that $N_{Re}$, the Reynolds number, is at least $1 \times 10^5$.

The shear applied to the slurry also is related to the impeller discharge rate (Q) and the velocity head (H). The following equations relate velocity head, pumping rate, and power for geometrically similar impellers under turbulent-flow conditions:

$$Q = N_Q N D_a^3$$

$$H = \frac{N_p N^2 D_a^2}{N_Q g_c}$$

wherein Q is impeller discharge rate; $N_Q$ is discharge coefficient; H is velocity head; $N_p$ is a power number; $g_c$ is the gravitational conversion factor constant 980 (g cm/sec$^2$)/dyne or 32.2 ft-lb/(lb)(sec)(sec); N is impeller rotational speed (revolutions/sec); $D_a$ is impeller diameter; and $N_Q$ is 0.4 to 0.5 for a propeller with pitch equal to diameter at $N_{Re}=10^5$.

Therefore, for the above-described vessel, agitator and slurry, the impeller discharge rate (Q) was calculated using the above equation, with an $N_Q$ of 0.5, N of 1600 rpm (26.67 rev/sec) and $D_a$ of 8 cm. The calculated discharge rate Q was 6.83 liters/sec. Similarly, the velocity head (H) was calculated using the above equation, with an $N_{Re}$ of $10^5$, and $N_p$ estimated at about 5 (using a correlation in *Perry's Handbook*, page 19-8), $D_a$ of 8 cm, N of 26.67 rev/sec, $N_Q$ of 0.5 and $g_c$ of 980 (g-cm/sec$^2$)/dyne. The velocity head (H) was 465 ergs/gm. Therefore, to provide a doped magnetic iron oxide particle of the present invention, the slurry is subject to a sufficient shear such that Q is equal to or greater than 6.8 liters/sec and H is equal to or greater than 460 ergs/g.

In the high shear process just described, care should be taken to avoid oxidation during the doping process, because oxidation can be detrimental to magnetic properties and thermal stability.

EXAMPLE 5

The following solutions were prepared:
Solution A1: 80 g NaOH in 200 ml DI water
Solution B1: 8.9 g FeSO$_4$·7H$_2$O in 200 ml DI water
Solution C1: 4.05 g CoCl$_2$·6H$_2$O in 200 ml DI water.

Then, γ-Fe$_2$O$_3$ (20 g of YS 1911 available from ISK) was thoroughly dispersed in 70 ml DI water using a blender for 5 minutes. The resulting dispersion was transferred to the previously-described vessel equipped with a Cowles mixer and including 1 liter of deionized water. Solution A1 was added to the dispersion while agitating at a rate of 1680 rpm and purging the vessel with a nitrogen blanket at a flow rate of 18 l/min. A high nitrogen flow rate was used to prevent oxidation of the doped magnetic iron oxide particles during the doping reaction, in this case, because the reaction vessel was not tightly sealed. High shear mixing was maintained throughout the doping reaction. After cooling the vessel to 30° C., one half of solution B1 was added to the slurry dropwise at a rate of about 2 ml/min. After the completion of this addition, one-half of the solution C1 was added to the vessel dropwise at a rate of about 2 ml/min. The temperature of the resulting slurry then was increased gradually to 95° C. at a rate of 1.2 C.°/min. and the doping reaction was continued for 3.5 hours. The same addition procedure was repeated for the remainder of the solutions B1 and C1. Finally, the slurry was diluted with deionized water, washed by magnetic sedimentation and decanted until the pH was 7.5. The slurry was filtered, and the filter cake was dried in air at room temperature for 14 hours.

The doped magnetic iron oxide particle of Example 5 had a coercivity of about 960 to about 1070 Oe and a SFD of about 0.4. The ISK γ-Fe$_2$O$_3$ raw material had a coercivity of 381 Oe, a $B_r$ of 1360 G, an Sq of 0.874 and a SFD of about 0.28. The improved doped magnetic iron oxide particle was achieved by using high shear mixing.

Table 3 summarizes results from Example 5 and several representative comparative experiments. In the comparative examples, the amounts of cobalt(II) and iron(II) were varied, and the magnetic iron oxide particles were predispersed in an Igarashi mill before doping with cobalt(II) and iron(II) in the absence of both a silicate compound and high shear mixing. Fe$^{+2}$ final is the weight percent Fe$^{+2}$ (based on the weight of γ-Fe$_2$O$_3$ raw material as 100%), found by analysis.

The parameter (ΔHc/100)×(1/SFD) was calculated in order to take into account the inverse $H_c$—SFD relationship. $\Delta H_c$ is the final $H_c$ less the starting $H_c$ (381 Oe). As $H_c$ increases 1/SFD decreases, and vice versa. Since it is desired to maximize both $H_c$ and 1/SFD, the parameter (ΔHc/100)×(1/SFD) was used to indicate the benefit of the inventive sample by comparison to the comparative examples.

TABLE 3

|  | Co$^{+2}$ | Fe$^{+2}$ | NaOH | solids | mixing | N$_2$ flow | H$_c$ | 1/SFD | B$_r$ | Fe$^{+2}$ (final) | (ΔH$_c$/100) × (1/SFD) |
|---|---|---|---|---|---|---|---|---|---|---|---|
|  | % at | % at | N | % wt. | rpm | l/min. | Oe | — | G | % |  |
| Example 5 | 5 | 9 | 1 | 1.25 | 1680 | 18 | 972 | 2.57 | 1400 | 9 | 15.21 |
| Comparative Example 5 | 9 | 18 | 1 | 1.25 | 530 | 10 | 982 | 1.91 | 1314 | 14.4 | 11.5 |
| Comparative Example 6 | 5 | 9 | 1 | 1.25 | 850 | 10 | 961 | 2.01 | 1236 | 7 | 11.67 |
| Comparative Example 7 | 2 | 4 | 1 | 1.25 | 700 | 10 | 693 | 2.87 | 1496 | 4.4 | 8.98 |

Table 3 illustrates that a doped magnetic iron oxide particle prepared under high shear conditions exhibits the combination of high $H_c$, 1/SFD and $B_r$. Doped magnetic iron oxide particles prepared in the absence of a silicate compound and under low shear conditions, even if acceptable in one property, do not possess this combination of magnetic properties. For example, the doped magnetic iron oxide particles of Example 5 and Comparative Example 6 were prepared by an identical method except high shear mixing was used in Example 5, and in Comparative Example 6, the γ-Fe$_2$O$_3$ was predispersed but reacted under low shear conditions. Example 5 also utilized a higher nitrogen flow. The doped magnetic iron oxide particles of Example 5 and of Comparative Example 6 exhibited an essentially identical $H_c$. However, the particles of Example 5 showed significant improvement in SFD (i.e., a 0.56 increase in 1/SFD) and $B_r$ compared to the particles of Comparative Example 6. A difference of greater than 0.1 in 1/SFD is a significant SFD difference.

Doped iron oxide particles having a coercivity of about 900 to about 1300 Oe have received renewed attention. However, previous doped magnetic iron oxide particles had a wide SFD that inhibited use in high density applications.

The present invention overcomes this disadvantage of prior doped magnetic iron oxide particles.

What is claimed is:

1. A method of manufacturing a doped magnetic iron oxide particle having the general formula:

$Co_xFe^{+2}_{1-x}Fe_2^{+3}O_4$, wherein $0<x\leq 1$, comprising the steps of:

(a) forming an aqueous mixture of a magnetic iron oxide and a base;

(b) agitating the mixture of step (a) under high shear conditions such that there is turbulent flow with Reynolds number ($N_{Re}$) of at least $10^5$, impeller discharge rate (Q) of at least 6.8 liters/second and velocity head (H) of at least 450 ergs/gram;

(c) adding a dopant compound selected from the group consisting of cobalt(II) compounds, iron(II) compounds and mixtures thereof to the agitated mixture of step (b);

(d) maintaining agitation under the high shear conditions of step (b) and heating the aqueous mixture of step (c) to a sufficient temperature and for a sufficient time for the dopant compound to react with the magnetic iron oxide and form the doped magnetic iron oxide particle; and (e) separating the doped magnetic iron oxide particle from the aqueous mixture of step (d).

2. The method of claim 1 wherein a silicate compound is added to the agitated mixture of steps (a), (b), (c) or (d) before the reaction of step (d) has been completed.

3. The method of claim 1 wherein oxygen is displaced from the agitated mixture of step (b) in steps (c) and (d).

4. The method of claim 1 wherein the doped magnetic iron oxide particles from step (e) are dried in an inert gas.

* * * * *